(12) United States Patent
Meijer et al.

(10) Patent No.: US 12,302,855 B2
(45) Date of Patent: May 20, 2025

(54) ROBOT MILKING DEVICE

(71) Applicant: LELY PATENT N.V., Maassluis (NL)

(72) Inventors: Jan Gerrit Jonathan Meijer, Delft (NL); Leendert Kornelis Roelse, Ouddorp (NL); Mario Henrique Voorsluys, Gouda (NL); Thanh Mung Lam, Dordrecht (NL)

(73) Assignee: LELY PATENT N.V., Maassluis (NL)

( * ) Notice: Subject to any disclaimer, the term of this patent is extended or adjusted under 35 U.S.C. 154(b) by 0 days.

(21) Appl. No.: 18/006,211

(22) PCT Filed: Jul. 15, 2021

(86) PCT No.: PCT/IB2021/056413
§ 371 (c)(1),
(2) Date: Jan. 20, 2023

(87) PCT Pub. No.: WO2022/018586
PCT Pub. Date: Jan. 27, 2022

(65) Prior Publication Data
US 2024/0008439 A1    Jan. 11, 2024

(30) Foreign Application Priority Data
Jul. 23, 2020   (NL) .................................... 2026125

(51) Int. Cl.
*A01J 5/017*     (2006.01)
(52) U.S. Cl.
CPC .................................. *A01J 5/0175* (2013.01)
(58) Field of Classification Search
CPC .............. A01J 5/017; A01J 5/0175; A01J 5/02
See application file for complete search history.

(56) References Cited

U.S. PATENT DOCUMENTS

| 6,575,116 B1* | 6/2003 | Birk | A01J 5/0175 |
| | | | 119/14.48 |
| 8,671,884 B2* | 3/2014 | Gehm | A01J 5/007 |
| | | | 119/14.08 |

(Continued)

FOREIGN PATENT DOCUMENTS

| WO | WO 2017/052361 A1 | 3/2017 |
| WO | WO 2017/105222 A1 | 6/2017 |

OTHER PUBLICATIONS

International Search Report issued Oct. 20, 2021 in PCT/IB2021/056413 filed Jul. 15, 2021, 4 pages.

*Primary Examiner* — Magdalena Topolski
*Assistant Examiner* — Spencer T Callaway
(74) *Attorney, Agent, or Firm* — Oblon, McClelland, Maier & Neustadt, L.L.P.

(57) ABSTRACT

A robot milking device for fully automatic milking includes milking means with a plurality of teat cups, a robot arm for moving the teat cups and connecting these to the teats, and provided with one teat cup holder for each teat cup, for removably placing the teat cup thereon in a rest state, a teat position determination device for determining teat positions, and a control device for the robot milking device and for moving the robot arm on the basis of the determined teat positions. The control device is configured to move the robot arm into a rest position during milking and to detect a cup separation signal which indicates that no teat cup is attached to at least one front teat. The control device is furthermore configured to adapt the rest position as a function of the cup separation signal.

15 Claims, 2 Drawing Sheets

(56) References Cited

U.S. PATENT DOCUMENTS

Figure 1:
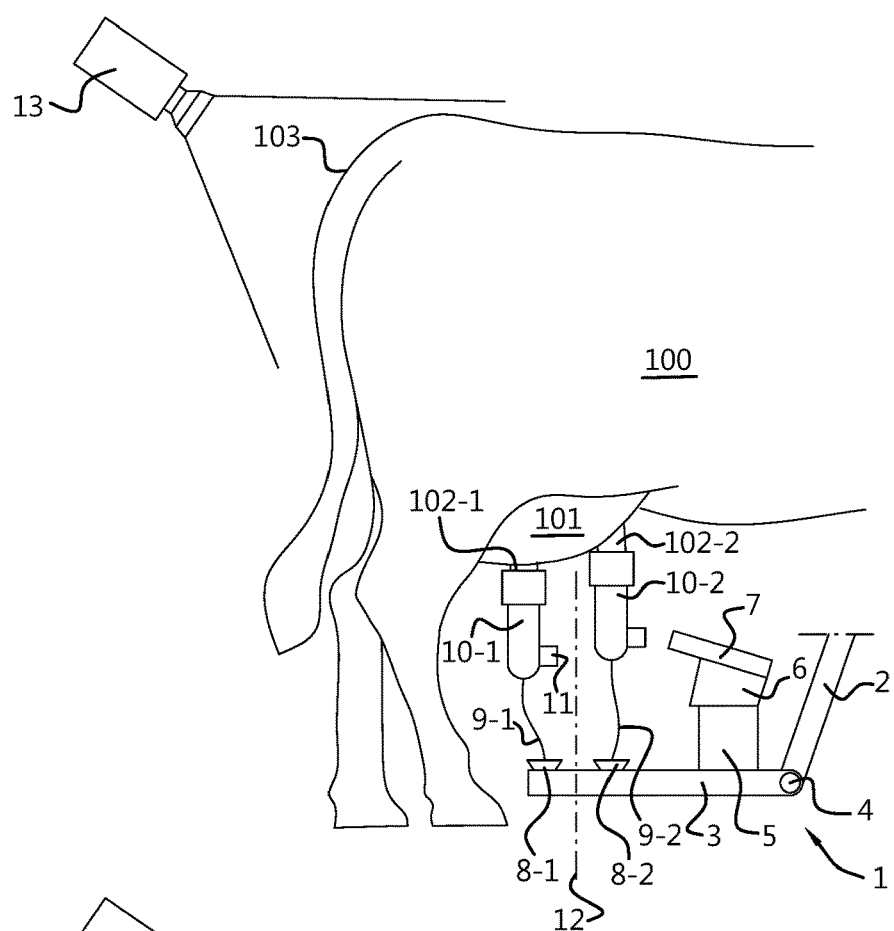

2015/0071491 A1\* 3/2015 Fedorenko ............... G06T 7/75
  382/103
2018/0343823 A1 12/2018 Wisse et al.
2018/0359983 A1 12/2018 Van Den Berg et al.

\* cited by examiner

ROBOT MILKING DEVICE

The invention concerns a robot milking device for fully automatic milking of a dairy animal with front teats and rear teats, comprising milking means with at least a plurality of teat cups, a robot arm for moving the teat cups and connecting these to the teats, and provided with one teat cup holder for each teat cup, for placing the teat cup releasably thereon in a teat cup rest state, a teat position determination device for determining a teat position of the teats of the dairy animal, and a control device for controlling the robot milking device and for moving the robot arm on the basis of the determined teat position, wherein the control device is configured to move the robot arm into a rest position during milking and is furthermore configured to detect a cup separation signal indicating that no teat cup is attached or will be attached to at least one front teat.

Such robot milking devices or milking robots are now generally known and can completely independently milk a herd of dairy animals such as dairy cows. Roughly, two systems are known, a system in which a robot arm with a gripper in each case takes a teat cup from a magazine to connect this to a teat, and a system such as the Lely Astronaut® milking robot, in which the robot arm carries all teat cups simultaneously and connects these to the teats from the robot arm itself. The invention is directed towards the latter type of robot milking device.

Robot milking devices in themselves have the advantage that in principle the robot arm can remain below the teat cups, but much closer than the individually connecting robot arm. Therefore the chance that a teat cup will fall onto the ground and become soiled is substantially smaller. Despite this, it appears in practice that the teats themselves may become soiled, and thereby for example even become inflamed, which is of course undesirable.

The object of the invention is to provide a robot milking device of the type cited in the introduction, in which the above disadvantage is in any case reduced.

The invention achieves said object with a robot milking device according to claim 1, in particular a robot milking device for fully automatic milking of a dairy animal with front teats and rear teats, comprising milking means with at least a plurality of teat cups, a robot arm for moving the teat cups and connecting these to the teats, and provided with one teat cup holder for each teat cup, for placing the teat cup releasably thereon in a teat cup rest state, a teat position determination device for determining a teat position of the teats of the dairy animal, and a control device for controlling the robot milking device and for moving the robot arm on the basis of the determined teat position, wherein the control device is configured to move the robot arm into a rest position during milking and is furthermore configured to detect a cup separation signal indicating that to at least one front teat there no longer is or will be attached a teat cup, wherein the control device is furthermore configured to adapt said rest position as a function of said cup separation signal.

Studies have shown that, during unexpected movements of the dairy animal, the teats which lie closest to the robot arm, usually the front teats, can come into contact with the robot arm or at least a protruding part thereof. The robot arm as part of the robot milking device is situated in a milking parlour with dairy animals, and as such in a dirty environment. Thus dung or other dirt can be deposited on the robot arm. Therefore often a protective cover is provided above the teat position determination device placed on the robot arm. But then the cover captures the dirt or dung, and at least partly protrudes past the teat position determination device and sits relatively high on the robot arm. Therefore it is often this cover with which the teats come into contact. In the known robot milking device, the robot arm remains close to the teat cups in order to be able to catch these quickly. A version is also known in which the robot arm is placed at a distance from the teats immediately after connection, but this again has the disadvantage that the milking lines and the withdrawal elements of the teat cups are then under increased tension, and the freedom of movement for the dairy animal is limited, with a greater chance of a teat cup pulling off due to unexpected movement which the robot arm cannot follow. According to the present invention, an optimum between the two versions has been found, wherein during milking a rest position for the robot arm is maintained which is favourable for milking, with the robot arm close to the teat cups, and no or only a slight tension is applied to the teat cups and the withdrawal elements, and there is a great freedom of movement for the dairy animal, while the possibility is provided of adapting the rest position if a cup separation signal is detected which indicates that the teat cup has become separated from a front teat, or will become separated very shortly because decoupling of the teat cup from the front teat has begun. Since the front teat is free, or will very shortly become free, there is a chance that an unexpected movement of the dairy animal will cause the exposed teat to come into contact with part of the robot arm. It is thus better and more hygienic if the robot arm is at a greater distance. Admittedly the tension on the other milking lines and withdrawal elements will increase, but this is only for a relatively small part of the milking.

It is important to note that the rest position of the robot arm is the position which is assumed during milking of the teats, and not the position during connection of the teat cups. It will be clear that during connection, the robot arm is often necessarily much closer to the teats, in particular closer to the front teats during connection of the rear teats. Not only is this difficult or impossible to avoid, but in addition it is less harmful for the (front) teat than to come into contact with dirt shortly after milking. After all, the teat orifice is not yet closed, so dirt with which the teat can come into contact can more easily penetrate the teat.

It is also noted here that in some other documents, a teat detection system is described which is situated in the middle of the teat cups, and can only detect the teats after itself rotating. This does not appear to work in practice because a rotation system is then necessary for the teat detection system, which in turn requires an angle calibration for the teat detection system, and in addition there is very little space between the milking cups to offer room for such a teat detection system with protective cover. Therefore such never-yet-built robot milking devices fall outside the scope of the present invention.

The cup separation signal is a signal that the teat cup has become separated, i.e. is no longer or no longer correctly attached to the teat. Such a signal is generated for example by detection of a sudden loss of vacuum, as known in itself. Also an acceleration sensor or the like can detect separation. In addition, it may be that the teat cup is incorrectly connected, such as onto the udder or onto a double-folded teat, whereby the milking vacuum cannot be built up correctly. The signal that the milking vacuum does not fulfil a predefined criterion should then be regarded as a cup separation signal, since there is an increased chance either that the teat cup will detach spontaneously or is actively removed in order to be reconnected. In addition, the cup separation signal contains the signal that the robot milking device will terminate milking for a teat, for example by decoupling the milking vacuum or actively withdrawing the teat cup from the teat. In any case, the teat cup will become separated from the teat within a foreseeable time, so that the robot arm according to the invention can now be preventatively brought into an adapted rest position. The cup separation signal may then be compared to the signal that the milk flow from the teat concerned meets a decoupling criterion, according to which the control system will start the corresponding decoupling protocol for that teat cup.

Particular embodiments are described in the dependent claims and in the next part of the description introduction.

In some embodiments, the control device is configured for setting said rest position, during milking and in the absence of a cup separation signal, as a neutral position wherein the robot arm with said teat cup holders is situated under said teats, in particular centrally under said teats. Although it is possible to keep the robot arm for example as far as possible away from the teats or connected teat cups, in conjunction with reducing the tension on the milking hoses and the withdrawal elements and for the greatest possible freedom of movement of the dairy animals, it is advantageous to have the rest state initially below said teats, in particular centrally below said teats. On a cup separation signal, the control system can then move the robot arm from the neutral position to another position, in particular further away from the (front) teats.

In some embodiments, the control device is configured for furthermore setting said rest position depending on the milking or not milking of all front teats, during a milking turn. Sometimes it may occur that not all (front) teats are milked during a milking. For example during a previous milking, the milking of one or more rear teats and where applicable one front teat may have been disrupted. It is then possible in a following milking to milk only the teats which were not or not completely milked, without milking the fully milked teat or teats. The latter in any case only imposes a load on the teat or teats concerned. In such a case, there are thus one or more front teats which were not fully milked during the milking. In this case according to the invention, it is possible to adapt the rest position to a distance from the front teats even from the start of the milking. This is indeed similar to the known robot milking device, but in the latter the rest state is always displaced over a distance with respect to the middle of the teats, and thereby in most cases in front of the front teats, with the above-mentioned disadvantage of increased tension and reduced freedom of movement. In the case of these embodiments of the present invention, this disadvantage occurs only in the very rare case that not all available (front) teats are milked.

In some embodiments, the control device is configured for increasing a horizontal distance between the robot arm and the, in particular foremost, front teat without teat cup, in a longitudinal direction of the dairy animal, more particularly up to at least a predefined threshold distance. The distance between the robot arm and the front teats, in particular of course the foremost front teat, may be increased by moving the robot arm away from the front teat or teats. This may be achieved in various ways, but advantageously the robot arm is moved forward by the control device in a horizontal longitudinal direction, which brings the advantage that the robot arm does not come too low to the ground, and can still optimally capture the now connected teat cups on separation, so there is less risk of them falling onto the ground. A sideways movement is also possible but has the disadvantage that most unexpected movements of the dairy animal will be in the longitudinal direction, and a sideways movement is only relevant if it is greater than half the width of the relevant part of the robot arm, in particular the protective cover above the teat position determination device.

The threshold distance may be a value based on practical measurement, such as 10 cm or the like. The threshold distance may if desired be animal-dependent. Large Holstein-Friesian cows will need a greater distance than smaller Jersey cows etc. Also, a young cow which is often not yet fully grown will on the one hand probably be proportionally smaller than a fully grown cow of the same breed, but on the other hand will have more freedom of movement in a milking stall.

In particular embodiments, the robot milking device furthermore comprises an animal position determination device for determining the position of the dairy animal, as the position of a characteristic animal part of the dairy animal, not being a teat position, wherein the control system comprises information concerning the position of the teats with respect to said characteristic point and is configured for adapting the rest position depending on the determined animal position. In principle it is possible to choose the rest position for the robot arm on the basis of the teat position that was determined in order to be able to connect the teat cups. Since the dairy animal however can itself also move, it may be useful to determine the animal position e.g. using the animal position determination device for determining the position of a characteristic point on the animal. The characteristic point gives a direct or indirect indication of the position of the dairy animal, and is usually a rear end or protruding hip bone, but not a teat. By determining the position of this characteristic point, the control device may determine, partly also on the basis of known information concerning the position of the teats with respect to this characteristic point, where the teats are situated and set the rest position accordingly. Such information is usually present in a memory of the control device, so this is often used during the first part of the teat cup connecting process in which the arm must determine a position in order to move below the dairy animal.

The animal position determination device may be selected from many devices known per se, such as a mechanical probe, an ultrasound sensor or an optical camera. Advantageously, the device comprises a 3D camera, such as in particular a time-of-flight camera which in one go can produce a spatial image of for example a rear end of the dairy animal. The control system can process this image, for example by detecting therein said characteristic point and thus determining its position.

In some embodiments, the control device is configured for the animal position determination device or teat position determination device to repeatedly determine the animal position or teat position respectively of the at least one front teat without teat cup during milking of the dairy animal, and to adapt said rest position dynamically to said animal position or teat position respectively. Although it is possible to adapt the rest position once to the animal position or the determined animal part position, for example by assuming an associated maximum movement, it is advantageous to determine said animal position or teat position repeatedly. Thus the robot arm can follow any movements of the animal and in each case adapt the rest position of the robot arm accordingly. This in turn makes it possible to place the robot arm always in a favourable position to capture any separating teat cups and with respect to the minimum possible tension on the milking hoses and withdrawal means.

An advantageous measure may be that the control system is configured to determine which front teat is concerned by said separation, and for moving said rest position in the horizontal direction transversely to the longitudinal direction and away from said front teat. Thus the rest position may be adapted to a position towards a remaining front teat which has not yet been milked. Thus the possible tension on the milking hose concerned and the withdrawal means may be further minimised. If desired, the rest position can thus be moved such that the teat cup holder of the front teat which has not yet been milked is situated in the adapted rest position below the associated teat cup. Alternatively, the rest position may be moved such that the distance between the teat cup holders that belong to all teats that have not yet been milked is on average as small as possible, e.g. to a weighted mean position.

The invention also concerns a method according to claim 7 for fully automatic milking of a dairy animal with front teats and rear teats using a robot milking device according to any of the preceding claims, the method comprising bringing the robot arm with teat cups on teat cup holders below the dairy animal, determining the position of the teats to be milked using the teat position determination device attached to the robot arm, connecting one or more teat cups from the teat cup holders to the teats on the basis of the determined positions, and milking the teats concerned with the connected teat cups; furthermore comprising determining by means of the control device a rest position of the robot arm with respect to the teats during milking of the teats to be milked, monitoring by means of the control device a cup separation signal indicating that no teat cup is attached anymore to at least one front teat, and on detection of said cup separation signal, moving the robot arm by means of the control device to an adapted rest position which lies at a greater distance from the front teats in the longitudinal direction of the dairy animal, in particular further forward. The advantages of the method according to the present invention correspond to the advantages of the robot milking device and need not therefore be repeated in full.

Particular embodiments of the method according to the invention are described in the dependent claims and in the following part of the description introduction.

In some embodiments, the method furthermore comprises bringing the robot arm to said adapted rest position by means of the control device if at least one front teat is not to be milked during said milking. As explained for the device, it is then indeed less risky because the front teat orifice remains closed, but it is still recommended to avoid soiling of the front teat as far as possible. Note that the adapted rest position is adopted after connection of all teat cups to teats which must be milked.

In some embodiments, the rest position during milking of all teats is an all-teat rest position with the teat cup holders below, more particularly centrally below the teats, and said adapted rest position lies forward by at least a predefined distance with respect to the all-teat rest position or at least by a predefined distance in front of the position of the foremost front teat, in each case viewed in the longitudinal direction of the dairy animal. Just as for the device according to the invention, a usual rest position for the robot arm when all teats with teat cups are milked is such that the teat cup holders each lie more or less directly below, or in any case as close as possible to, the associated teat cup. If the rest position is adapted according to the invention, this is done by for example moving the robot arm over at least a fixed distance such as between 8 and 10 cm, in particular away from the nearest teats. Alternatively, the robot arm may be moved at least by a predefined distance past the nearest teat, usually the foremost front teat. It is noted that the phrase "moving the robot arm such that" means "moving the robot arm such that the teat cup holders", except in cases concerning the possible collision of teats and the robot arm, in which case it means "moving the robot arm such that the relevant colliding part (usually the teat position determination device)". The context will make the meaning clear.

In favourable embodiments, the robot arm is moved below the dairy animal from a side of the dairy animal, and the robot arm is moved forward with respect to the dairy animal for the purpose of the adapted rest position. This is a more common method for moving the robot arm than moving it from the rear between the rear legs, partly because there is more space from the side for swivelling the robot arm and partly because there is less chance of soiling the robot arm with dung. In the most common method, the teat position determination device is therefore almost always in front of the front teats in the longitudinal direction of the dairy animal, so that moving forward ensures more distance from the teats.

Nonetheless, according to the invention it is certainly possible to connect the robot arm from the rear between the rear legs. In this case it is possible to move the teat position determination device firstly past the teats and then into a position in front of the front teats, looking towards the back. In this case the invention with the abovementioned particular embodiments remains valid without restriction. It is however also possible for the teat position determination device to look forward from the rear, i.e. from behind the rear teats. Then, in the present invention, the term "front teat" would now have to read "rear teat" etc., since now the rear teats would be the closest to the teat position determination device.

Figure 2:
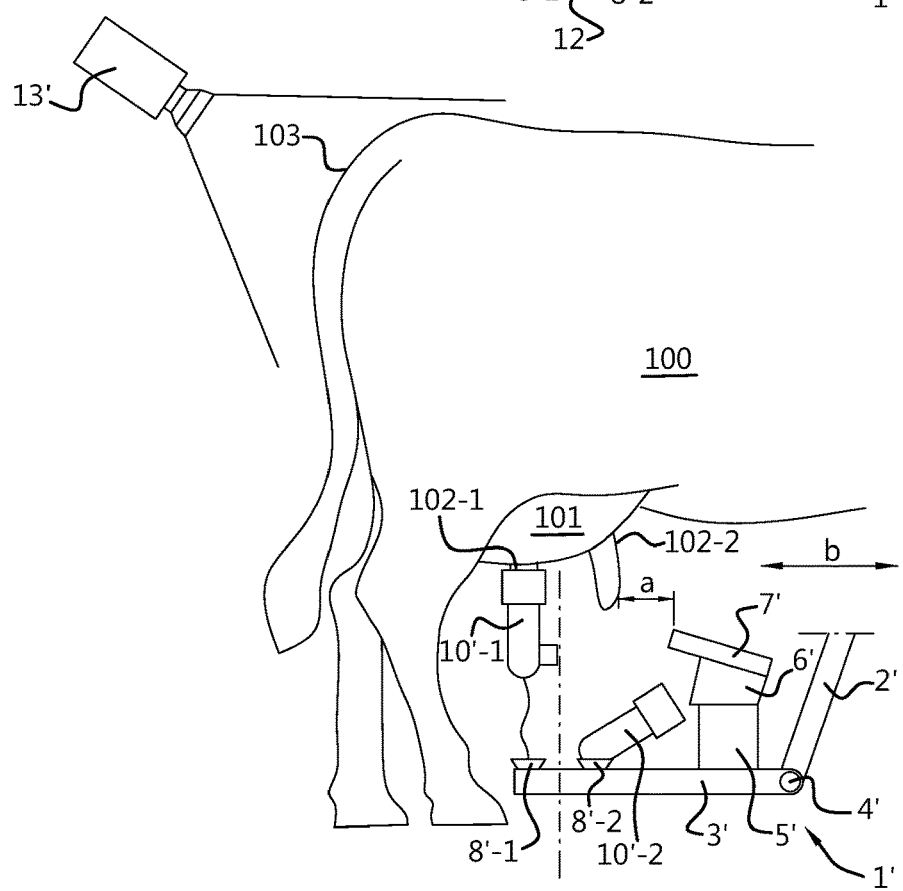
Figure 3:
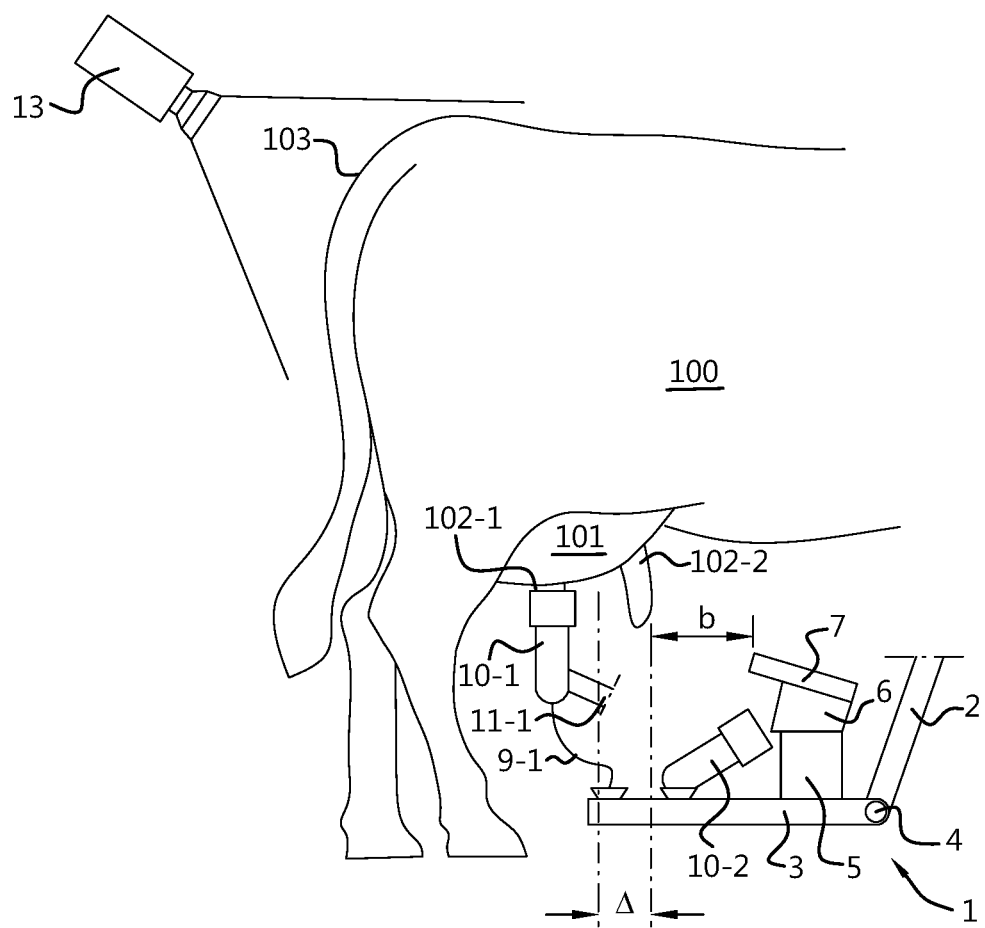

The invention will now be explained in more detail with reference to some non-restrictive embodiments and the drawing, which shows in each case in a schematic side view:

FIG. 1: a milking robot milking device,

FIG. 2: a robot milking device according to the prior art with a non-connected front teat, and FIG. 3: a robot milking device according to the invention with a non-connected front teat.

FIG. 1 shows in schematic side view a robot milking device when milking, both according to the prior art and according to the invention. The robot milking device is indicated with reference numeral 1 and serves to milk a dairy animal 100, here a cow, with an udder 101 and teats 102-1 and 102-2 and a rear end 103, and comprises a robot arm part 2 and an end part 3 which are hinged on a hinge 4. The end part 4 carries a structure 5 with a teat position determination device 6 and a cover 7, and teat cup carriers 8-1 and 8-2 on which, by means of a cord 9-1 and 9-2, teat cups 10-1 and 10-2 can be withdrawn. Reference 11 indicates a milk hose and pulsation hose combination, and the connection thereof to the teat cup. Reference 12 is a line in the middle between the teat cups, the teats and the teat cup carriers. Finally, reference 13 indicates a cow position detector.

The robot milking device 1 here milks the dairy animal 100 with the teat cups 10-1 and 10-2 connected to the rear teat 102-1 and the front teat 102-2. In reality, the dairy animal 100 will have more teats, such as four in the case of a normal cow. For the sake of clarity however, this is disregarded here. In addition, for the overview, parts not relevant to the invention have been omitted, such as the rest of the milking and pulsation hoses 11 of each teat cup, the rest of the robot arm 2, 3, the teat cleaning means etc.

The control device of the robot milking device 1 is also omitted for the sake of clarity. In practice, this is connected by means of a hard-wired or wireless connection to the relevant components, such as in particular the teat position determination device 6. The latter is here a laser scanner but may also be a 2D or 3D camera or the like. In order to protect the teat position determination device 6 from soiling, in particular from dirt falling from the milked dairy animals 100, this is protected by a cover 7 on the top.

During milking, the teat cups 10-1 and 10-2 are connected to the rear teats 102-1 and 102-2 respectively. The teat cup 10-1 is connected by a cord 9-1 to the teat cup carrier 8-1 at the end part 3, and the teat cup 10-2 is connected by a cord 9-2 to the teat cup carrier 8-2. At the end of milking or on kicking by the cow, on an incorrect connection or the like, a teat cup becomes separated from the teat. The teat cup is then withdrawn onto the teat cup holder by means of the cord 9.

To prevent the teat cup 10 from touching the ground before the milking device 1 can withdraw this, by means of the cord 9, onto the teat cup carrier 8, it is favourable if the teat cup carriers 8 are situated or remain situated close to the teat cups. It is also favourable to prevent unnecessary tension on the milking and pulsation hose 11. Therefore the teat cup carriers 8-1 and 8-2 are here arranged symmetrically with respect to the line 12 which forms the middle between both the teats, the teat cups and the teat cup carriers.

To be able to place the end part 3 correctly with respect to the teat cups 10, the robot milking device 1 uses position information. In the example shown, this position information may relate to the cow 100 and be obtained using the cow position detector 13. This is for example a 3D time-of-flight camera or other stereo camera, or a sensor or the like. In the case of a 3D time-of-flight camera or other optical detector, a characteristic point of the cow is determined and followed, usually a rear end 103, or a clearly protruding bone or the like. The control system also contains information on the relevant position of the udder 101, with the teats, with respect to the rear end 103, so that on movement of the rear end 103, the movement of the udder 101 with the teats 102 can be derived, and the position of the end part 3 can be adapted accordingly.

It is also possible to measure directly the movement of the teat cups 10 or teats 102, for example using the teat position determination device 6 which then measures and follows the relative position of the teat cups 10, whereby the control system keeps the initial relative position of the end part 3 with respect to the teat cups 10 as constant as possible.

FIG. 2 shows in a diagrammatic side view a robot milking device 1' according to the prior art with a non-connected front teat 102-2. In the entire drawing, similar components are indicated with the same reference signs, and where the reference signs specifically relate to the device according to the prior art, they are indexed with an apostrophe.

In this case, it can be seen that the rear teat 102-1 is still being milked with the teat cup 10'-1, but the front teat 102-2 is no longer being milked and the associated teat cup 10'-2 has been withdrawn onto the teat cup holder 8'-2 and folded into the rest state. The end part 3' initially remains at the same point as in FIG. 1.

The distance between the cover 7' and the front teat 102-2 is indicated as a. Also, b indicates the distance over which a cow can move in the longitudinal direction at the milking site. The value of b can be measured in practice per animal, animal type, animal length etc. It will be clear that in particular a rather sudden movement which cannot be followed well by the milking device 1' may lead to the cover 7' coming into contact with the front teat 102-2. Since the cover 7' serves to protect the scanner 6' against falling dirt such as excrement, the cover will often be relatively dirty. If the front teat 102-2 then touches the cover 7', dirt could enter the front teat because the orifice is not yet closed, which is of course undesirable.

FIG. 3 shows a robot milking device 1 according to the invention with a non-connected front teat 102-2. It can be seen that the end part 3 has been moved over a distance Δ to bring the distance between the front teat 102-2 and the cover 7 to at least the distance b. The chance that the front teat 102-2 will touch the cover 7 on a sudden movement of the cow 100 is thus minimal. A slow movement of the cow may indeed be absorbed by following the cow, such as with the camera 13 or teat position detector 6, but not a rapid movement. Also, there will be more tension on both the cord 9-1 and on the milking and pulsation line combination 11-1, but not only will this still be controllable without the disadvantages of in particular losing the cord, but it will probably only apply for a relatively small part of the milking.

It should also be noted that the forward movement of the end part 3, with respect to the cow, is useful only if no teat cup 10 is still connected to the front teat 102-2. The same does not apply, or at least to a very much lesser extent, to the rear teats 102-1 because the front teats 102-2 are between the rear teats and the cover. Also, it is less relevant when the front teats 102-2 are still covered by the teat cup 10-2, since the latter protects the front teat against dirt. Finally, soiling is less important if the front teat has not yet been milked, such as when the teat concerned is not milked during the milking or because a teat cup is yet to be connected to the teat concerned. Because the orifice is still closed, the dirt will not cause harm as quickly. Nonetheless, it is always at least slightly advantageous to maintain more distance from the front teat in this case too, but this is not always possible, for example if teat cups must still be connected, such as to rear teats. The most important advantage of the invention is that during milking, when at least the front teats are all connected, the end part 3 remains as close as possible to the teats/teat cups, and the end part 3 is moved sufficiently with respect to the front teat or teats that the chance of unintentional contact of the front teat with the cover or another protruding part of the robot arm can be avoided with sufficient reliability.

Here an alternative should also be mentioned in which teat cups are connected from the rear between the rear legs. It will be clear that the invention is then applicable when it is not a front teat 102-2 but a rear teat 102-1 which no longer carries a teat cup, and the end part 3 is then moved towards the rear, in a type of mirror image of the embodiment described above. The other details remain the same, and an important extra advantage of the present invention is that such an embodiment has far more to gain in terms of cleanliness because it is much more susceptible to soiling with dung.

The invention claimed is:

1. A robot milking device for fully automatic milking of a dairy animal with front teats and rear teats, comprising:
   milking means with at least a plurality of teat cups,
   a robot arm for moving the teat cups and connecting these to the teats, and provided with one teat cup holder for each teat cup, for placing the teat cup releasably thereon in a teat cup rest state,
   a teat position determination device for determining a teat position of the teats of the dairy animal, and
   a control device for controlling the robot milking device and for moving the robot arm on a basis of the determined teat position, wherein the control device is configured to move the robot arm into a rest position during milking and is furthermore configured to detect a cup separation signal indicating that to at least one front teat there no longer is or will be attachment to a teat cup, wherein the control device is furthermore configured to adapt said rest position to an adapted rest position as a function of said cup separation signal.

2. The robot milking device according to claim 1, wherein the control device is configured for setting said rest position, during milking and in the absence of a cup separation signal, as a neutral position wherein the robot arm with said teat cup holders is situated under said teats.

3. The robot milking device according to claim 2, wherein the robot arm with said teat cup holders is situated centrally under said teats.

4. The robot milking device according to claim 1, wherein the control device is configured for furthermore setting said rest position depending on the milking or not milking of all front teats, during a milking turn.

5. The robot milking device according to claim 1, wherein the control device is configured for increasing a horizontal distance between the robot arm and a front teat without a teat cup, in a longitudinal direction of the dairy animal.

6. The robot milking device according to claim 1, furthermore comprising an animal position determination device for determining a position of the dairy animal as a position of a characteristic animal part of the dairy animal, not being a teat position, wherein a control system comprises information concerning the position of the teats with respect to the position of the characteristic animal part and is configured for adapting the rest position depending on the determined position of the dairy animal.

7. The robot milking device according to claim 6, wherein the control device is configured for the animal position determination device or teat position determination device to repeatedly determine the position of the dairy animal or teat position respectively of the at least one front teat without a teat cup during milking of the dairy animal, and to adapt said rest position dynamically to said animal position or teat position respectively.

8. A method for fully automatic milking of a dairy animal with front teats and rear teats, using a robot milking device according to claim 1, the method comprising:
   bringing the robot arm with the teat cups on the teat cup holders below the dairy animal,
   determining positions of the teats to be milked with the teat position determination device attached to the robot arm,
   connecting one or more teat cups from the teat cup holders to the teats on a basis of the determined positions of the teats, and
   milking the teats concerned with the connected teat cups, furthermore comprising
   determining by means of the control device the rest position of the robot arm with respect to the teats during milking of the teats to be milked,
   monitoring by means of the control device the cup separation signal indicating that no teat cup is attached anymore to at least one front teat, and
   on detection of said cup separation signal, moving the robot arm by means of the control device to an adapted rest position which lies at a greater distance from the front teats in a longitudinal direction of the dairy animal.

9. The method according to claim 8, furthermore comprising bringing the robot arm to said adapted rest position by means of the control device if at least one front teat is not to be milked during said milking.

10. The method according to claim 8, wherein the rest position during milking of all teats is an all-teat rest position with the teat cup holders below the teats, and
   wherein said adapted rest position lies forward by at least a predefined distance with respect to the all-teat rest position or at least by a predefined distance in front of the position of the foremost front teat, in each case viewed in the longitudinal direction of the dairy animal.

11. The method according to claim 8, wherein the moving the robot arm by means of the control device to an adapted rest position is to a position which lies further forward at a greater distance from the front teats in the longitudinal direction of the dairy animal.

12. The robot milking device according to claim 1, wherein the control device is configured for increasing a horizontal distance between the robot arm and a foremost front teat without teat cup, in a longitudinal direction of the dairy animal.

13. The robot milking device according to claim 1, wherein the control device is configured for increasing a horizontal distance between the robot arm and the front teat without a teat cup, in a longitudinal direction of the dairy animal up to at least a predefined threshold distance.

14. The robot milking device according to claim 1, wherein the adapted rest position is a position which lies at a greater distance from the front teats of the dairy animal than a milking position in a longitudinal direction of the dairy animal.

15. The robot milking device according to claim 1, wherein the adapted rest position lies further forward at a greater distance from the front teats in the longitudinal direction of the dairy animal.

* * * * *